(12) United States Patent
Mackel et al.

(10) Patent No.: US 7,763,172 B2
(45) Date of Patent: Jul. 27, 2010

(54) FILTERING DEVICE

(75) Inventors: Wilfried Mackel, Oelde (DE); Tietz Helga, Oelde (DE)

(73) Assignee: Westfalia Separator AG, Oelde (DE)

( * ) Notice: Subject to any disclaimer, the term of this patent is extended or adjusted under 35 U.S.C. 154(b) by 1332 days.

(21) Appl. No.: 10/551,580

(22) PCT Filed: Mar. 11, 2004

(86) PCT No.: PCT/EP2004/002482

§ 371 (c)(1),
(2), (4) Date: Oct. 3, 2005

(87) PCT Pub. No.: WO2004/089519

PCT Pub. Date: Oct. 21, 2004

(65) Prior Publication Data
US 2007/0102338 A1    May 10, 2007

(30) Foreign Application Priority Data
Apr. 14, 2003   (DE)   ................... 103 17 274

(51) Int. Cl.
*B01D 35/22* (2006.01)
*B01D 33/21* (2006.01)
*B01D 63/16* (2006.01)
*B01D 33/39* (2006.01)

(52) U.S. Cl. .................. 210/304; 210/331; 210/321.68; 210/354; 210/398

(58) Field of Classification Search ............... 210/304, 210/331, 321.68, 398, 354
See application file for complete search history.

(56) References Cited

U.S. PATENT DOCUMENTS

| 3,187,898 | A | * | 6/1965 | Baker | 210/331 |
| 4,698,156 | A | * | 10/1987 | Bumpers | 210/331 |
| 4,975,188 | A | * | 12/1990 | Brunsell et al. | 210/324 |
| 6,558,545 | B1 | | 5/2003 | Bläse et al. | |
| 6,808,634 | B1 | | 10/2004 | Zegg | |
| 2003/0155292 | A1 | | 8/2003 | Zegg et al. | |

FOREIGN PATENT DOCUMENTS

| DE | 100 19 674 A1 | | 10/2001 |
| JP | 11226317 A | * | 8/1999 |
| WO | WO 00/47312 A1 | | 8/2000 |
| WO | WO 02/07478 A2 | | 1/2002 |
| WO | WO 02/07478 A3 | | 1/2002 |

OTHER PUBLICATIONS

Patent Abstract of Japan No. 06099041, Published Date Apr. 12, 1994, Masami, "Rotary Type Membrane Separation Device".

* cited by examiner

*Primary Examiner*—Thomas M Lithgow
(74) *Attorney, Agent, or Firm*—Barnes & Thornburg LLP

(57) ABSTRACT

A filtering device includes a container having an inlet and two or more spindles arranged in the device. Further included are at least two mutually axially offset diaphragm plates mounted on each of the two or more spindles. The two or more spindles are distributed in the container and rotatable relative to the container.

18 Claims, 1 Drawing Sheet

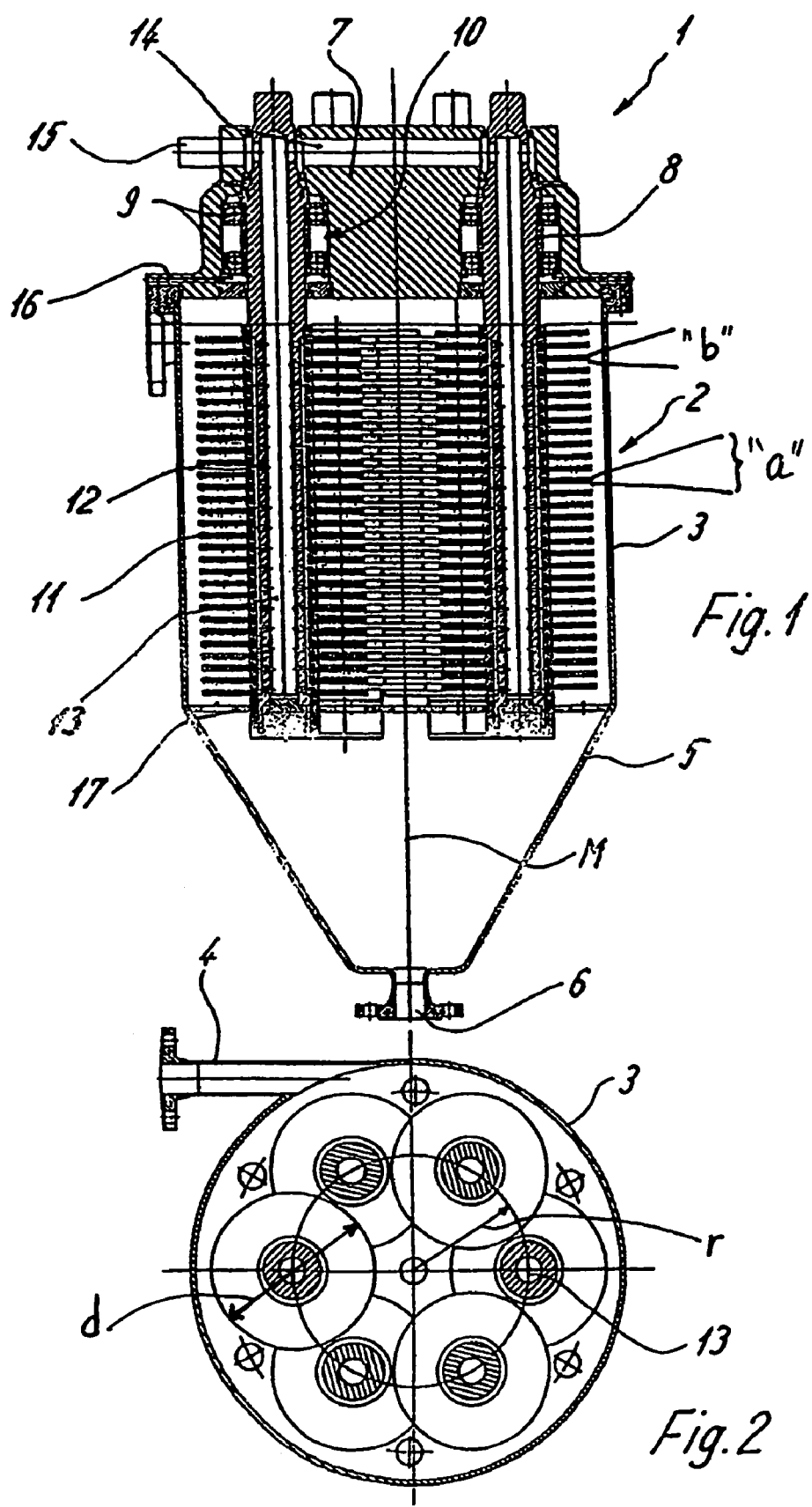

FILTERING DEVICE

BACKGROUND AND SUMMARY

The present disclosure relates to a filtering device having a container with an inlet. At least one spindle is arranged in the device. A plurality of mutually axially offset diaphragm plates are mounted on the spindles.

Filtering devices of this type are known. For example, from the field of separators it is known to place axially mutually offset diaphragm plates on the inlet pipe.

This arrangement has been successful. Nevertheless, there is demand for a filtering device with filtering disks, particularly diaphragm disks, which permits or has a good filtering effect, while the construction is particularly simple, and preferably has a low energy consumption.

The present disclosure addresses the above-referenced need by providing for a filtering device, that includes a container having an inlet and two or more spindles arranged in the device. Further included are at least two mutually axially offset diaphragm plates mounted on each of the two or more spindles. The two or more spindles are distributed in the container and rotatable relative to the container.

The filtering device of the present disclosure is characterized by a simple construction with a stationary non-rotatable container, a low energy requirement and the filtering effect is good.

The diameter of the diaphragm disks or plates may be so large or dimensioned such that the diaphragm plates of adjacent spindles overlap in their outer-circumference area. The diaphragm plates of adjacent spindles correspondingly are arranged axially offset with respect to one another.

The overlapping area provides a particularly low risk of the formation of a covering layer of solids on the diaphragm disks and thereby increases a sanitary suitability or design.

The inflow leads tangentially into the container which is cylindrical at least in sections. This results in a preliminary separation because of the centrifugal effect and in a possibility of being the sole or additional drive of the diaphragm plates with the spindles by the circulating liquid.

A plurality of spindles may be uniformly distributed on a circle of a radius "r" in the container.

According to another embodiment, the number of spindles is even so that a largely symmetrical arrangement is implemented in which the diaphragm plates of all spindles can overlap.

For implementing a sufficient processing capacity, it may be expedient to arrange a plurality of diaphragm plates, for example, ten or more on each spindle.

The container may be hydrocyclonically shaped. In a particularly favorable manner, this achieves a preliminary separation of solid particles which results in a minimized action of solids upon the diaphragm plates. As a result of the turbulence of the spindles and the diaphragm plates toward the outside, or away from the diaphragms of the diaphragm plates, the solids retained by the diaphragm surfaces are carried away downward by gravity.

Other aspects of the present disclosure will become apparent from the following descriptions when considered in conjunction with the accompanying drawings.

BRIEF DESCRIPTION OF THE DRAWINGS

FIG. 1 is an elevational sectional view of an embodiment of a filtering device, according to the present disclosure.

FIG. 2 is a top, partial sectional view of the filtering device of FIG. 1.

DETAILED DESCRIPTION

FIG. 1 illustrates a filtering device 1 with a stationary non-rotatable container 2 which is hydrocyclonically shaped. A cylindrical section 3 of the container 2 has a center axis M oriented perpendicularly or vertically and has a tangentially oriented inlet 4. Cylindrical section 3 is adjoined in a downward direction by a tapering conical section 5 which leads into an outlet 6 in a downward direction.

Because of the tangential inlet 4, a motor drive can be eliminated if product inflow speed is sufficient. That is because a forming twist drives diaphragm plates or disks 11 as a result of developing friction. However, for supporting a rotating movement, a drive (shown in phantom in FIG. 2) can optionally be utilized which has a motor with a belt transmission (not shown).

The container 2 or its cylindrical section 3 is closed on its top side by a type of lid which simultaneously is used as a bearing housing 7 for several spindles 8. The spindles 8 project from above into the container 2 and are oriented parallel to one another.

The spindles 8 project into the container 2 to the start of the conical section 5. The spindles 8 are, for example, each rotatably disposed by two bearings 9 in bores 10 of the bearing housing 7 in an overmounted manner. The overmounting of the vertically oriented spindles 8 has a particularly sanitary product space in the container 2 and additionally has reduced component and sealing expenditures. If necessary, a sieve sheet 17 can be inserted at an end facing away from the bearing housing 7. The sieve sheet 17 can be used for the support and friction damping of the spindles 8, which sieve sheet 17 is penetrated by the spindles 8. This arrangement has a positive effect particularly when there is a passing through a critical rotational speed. The bearing 9 is protected from a product overflow by leakage drains 16.

An even number of bores 10 with the spindles 8 may be included. For example, as shown in FIG. 2, a total of six spindles 8 are uniformly distributed on a circle having a radius r. The center axis M of the container 2 extends through the center of the cylindrical section 3.

At least two or more, for example, more than ten and even a large number of diaphragm plates 11 may be arranged on each of the spindles 8 in an area of the spindles 8 projecting into the container 2. The diaphragm plates 11 are shown, for example, having a round construction and are oriented concentrically with respect to the spindles 8.

The diaphragm plates 11 may include a ceramic material. In addition, they may have a two-layer construction, in which case an annulus (not shown) may be constructed between upper and lower ceramic layers. The annulus leads to an interior toward the spindles 8 into at least one duct 12 which, in turn, leads into discharge ducts 13 leading out vertically or perpendicularly to the diaphragm plates 11 toward a top of the device 1 in the spindles 8. These discharge ducts 13, in turn, lead out at their upper ends into a common ring-type discharge bore 14 in the bearing housing 7. The discharge bore 14 is provided with an outlet 15 for carrying away liquid from the filtering device 1.

The diaphragm plates 11 have a width "b" in the axial direction. The axial spacing "a" of the diaphragm plates 11 meets a requirement that a>b. That is, the diaphragm plates 11 are axially on the spindles 8 each spaced away from one another such that an edge of another diaphragm plate 11 can be slid in between them at an outer circumference.

As illustrated in FIG. 2, a diameter "d" of the diaphragm plates 11 is, in each case, selected to be so large that the diaphragm plates 11 of adjacent spindles 8 overlap one another in their outer circumference area. For this purpose, the diaphragm plates 11 on adjacent spindles 8 have to be arranged correspondingly axially offset with respect to one another.

The arrangement described above in FIG. 2 has the following function.

A free-flowing substance to be filtered is guided through the tangential inlet 4 into the filtering device 1 or its container 2. The inflowing liquid takes along the diaphragm plates 11 and in this manner causes each of the spindles 8 to rotate.

As a result of the hydrocyclonical shaping of the container 2, a preliminary separation is achieved which leads to a minimized action of solids upon the diaphragm plates 11.

At the diaphragm disks 11, particularly in the overlapping area of the diaphragm disks or plates 11, additional solids are separated from the substance to be filtered.

A filtered liquid phase flows through diaphragms of the diaphragm disks 11 into their annulus and from there through the ducts 12 as well as through the discharge ducts 13 and the discharge bore 14 and the outlet 15 to the outside.

The solids retained by the diaphragm surfaces of diaphragm plates 11 are thrown by turbulence toward the outside away from the diaphragm plates 11 and then discharged downward through the outlet 6.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A filtering device, comprising:
   a container having an inlet for a free flowing substance to be filtered;
   two or more spindles arranged in the device;
   at least two mutually axially offset diaphragm plates mounted on each of the two or more spindles; the inlet leading tangentially into the container;
   wherein the two or more spindles are distributed in the container and rotatable relative to the container; and
   wherein the two or more spindles are rotated by the free flowing substance introduced by the tangential inlet and without the use of a motor drive.

2. The filtering device according to claim 1, wherein the at least two mutually axially offset diaphragm plates have a thickness "b" in the axial direction, and the at least two mutually axially offset diaphragm plates are separated by an axial spacing "a", such that axial spacing "a" is greater than thickness "b".

3. The filtering device according to claim 1, wherein the two or more spindles are uniformly distributed in the container on a circle having a radius "r".

4. The filtering device according to claim 1, wherein the two or more spindles are vertically oriented.

5. The filtering device according to claim 1, wherein the two or more spindles include an even number of spindles.

6. The filtering device according to claim 1, wherein the at least two mutually axially offset diaphragm plates include more than ten mutually offset diaphragm plates arranged on each of the two or more spindles.

7. The filtering device according to claim 1, wherein the container has a hydrocyclonical shape.

8. The filtering device according to claim 1, wherein the container has a cylindrical section, and a tapering conical section which leads into an outlet for a solids phase.

9. The filtering device according to claim 1, wherein the container is stationary and non-rotatable.

10. The filtering device according to claim 1, wherein a diameter of the at least two mutually axially offset diaphragm plates is so dimensioned such that the at least two mutually axially offset diaphragm plates of adjacent spindles overlap in their outer circumference area, the at least two mutually axially offset diaphragm plates of adjacent spindles being arranged in a correspondingly axially mutually offset manner.

11. The filtering device according to claim 1, wherein the container is closed by a lid, which lid simultaneously is a bearing housing for the two or more spindles which spindles project in a mutually parallel manner from above into the container.

12. The filtering device according to claim 11, wherein the two or more spindles are each rotatably disposed by bearings in bores of the bearing housing.

13. The filtering device according to claim 11, wherein the two or more spindles are overmounted in the bearing housing.

14. The filtering device according to claim 12, wherein the bearings are protected from a product overflow by leakage drains.

15. The filtering device according to claim 1, wherein the at least two mutually axially offset diaphragm plates include a ceramic material.

16. The filtering device according to claim 15, wherein the at least two mutually axially offset diaphragm plates include an upper and lower layer, and an annulus is constructed between the two upper and lower ceramic layers, which annulus leads toward an interior of the device into discharge ducts extending in the two or more spindles.

17. The filtering device according to claim 16, wherein the discharge ducts lead from the two or more spindles into a common discharge bore in a bearing housing.

18. The filtering device of claim 3, wherein the two or more spindles are vertically oriented.

* * * * *